AUDIO SYSTEM WITH MODIFIED OUTPUT

Filed Nov. 21, 1968 3 Sheets-Sheet 1

Seymour Vogel
INVENTOR.
BY John F. Miller
Agent
John M. Pease
Attorney

AUDIO SYSTEM WITH MODIFIED CUTPUT

Filed Nov. 21, 1968

Seymour Vogel
INVENTOR.
BY John F. Miller
Agent
John M. Pease
Attorney

Seymour Vogel
INVENTOR.
BY John F. Miller
Agent
John M. Pease
Attorney

United States Patent Office — 3,518,566 — Patented June 30, 1970

3,518,566

AUDIO SYSTEM WITH MODIFIED OUTPUT

Seymour Vogel, Mount Pleasant, S.C., assignor to the United States of America as represented by the Secretary of the Navy Filed Nov. 21, 1968, Ser. No. 777,813
Int. Cl. H03g *5/06, 7/00*
U.S. Cl. 330—144 3 Claims

ABSTRACT OF THE DISCLOSURE

An adjustable feedback circuit including an adjustable loudness sensing network controls the attenuation of various signal components in the input to an audio system selectively while a frequency sensitive circuit in the system output may accentuate certain components, the total result being a selectively modified audio output.

The invention described herein may be manufactured and used by or for the Government of the United States of America for governmental purposes without the payment of any royalties thereon or therefor.

BACKGROUND OF THE INVENTION

The invention is in the field of audio systems. In the prior art a principal problem has been the attainment of an audio system output that has a constant level of loudness in spite of variations in the amplitude and other characteristics of the input signal. Such variations may be caused by a variety of factors, e.g., human speech level differences and variations, differences in the characteristics of musical instruments, the acoustics of the environment, etc. Applicant has solved this long standing problem of the prior art by providing means for sensing the output signal of an audio system and generating correcting feedback signals to modify the input signal so that the fiinal output of the system has the desired properties.

SUMMARY OF THE INVENTION

A feedback loop including an adjustable loudness sensing network controls a compression network in the input to an audio system. A frequency sensitive circuit in the output of the system amplifies selected components of the audio signal. The total effect on the audio signal results in a modified or compensated output which may be adjusted to obtain a desired result, e.g., a constant loudness output. Selected components of the signal may be attenuated, others may be amplified.

DESCRIPTION OF THE PREFERRED EMBODIMENT

In order to build an audio system having an output with desired qualities, the peculiarities of sound and the human hearing mechanism must be considered. Sound is a mechanical vibration within the frequency range of the ear and different sounds of different frequencies require an expenditure of different levels of energy in order to develop an equal loudness effect on the ear. For example, in speech, a shout requires an expenditure of approximately 500,000 times the power required for a quiet voice. The vowel sounds are powerful sustained sounds while the consonant sounds generally require less power. The "th" sound as in "thin" is the weakest speech sound. The power involved in speech is very small, average power for American speech may be no more than ten microwatts. Musical instruments develop sounds which may be vastly more powerful than speech and at frequencies which may range from below 60 c.p.s. up to 15,000 c.p.s. While most instruments produce sounds of greater power on the lower notes, that is, at frequencies below 500 to 1,000 c.p.s., some develop greater power at relatively high frequencies. Speech and musical sounds may consist of fundamental frequency and many harmonics, noise may comprise a mixture of a great many frequencies. The smallest variation in sound amplitude that the average ear can sense is an approximately constant percentage of the original intensity, that is, the loudness of sound is proportional to the logarithm of the intensity. The ear has a highly non-linear response to sound waves of large amplitude. The result of this nonlinearity is that in the presence of high amplitude sound waves, the human hearing mechanism produces harmonics and sum and difference tones which are not actually present in the sound, but which are sensed by the brain. These are referred to as "subjective tones." When the ear produces harmonics of lower frequencies which interfere with the perception of higher frequency sounds actually present, the higher frequency sounds are said to be "masked." "Masking" is important in noisy locations, since it is equivalent to a partial deafening. This is part of the reason for having to shout when speaking in a noisy location. Various studies which are too involved to be discussed here show that, in general, loudness is a complex function of frequency, the nature of the human hearing mechanism, and other factors.

Figure 1:
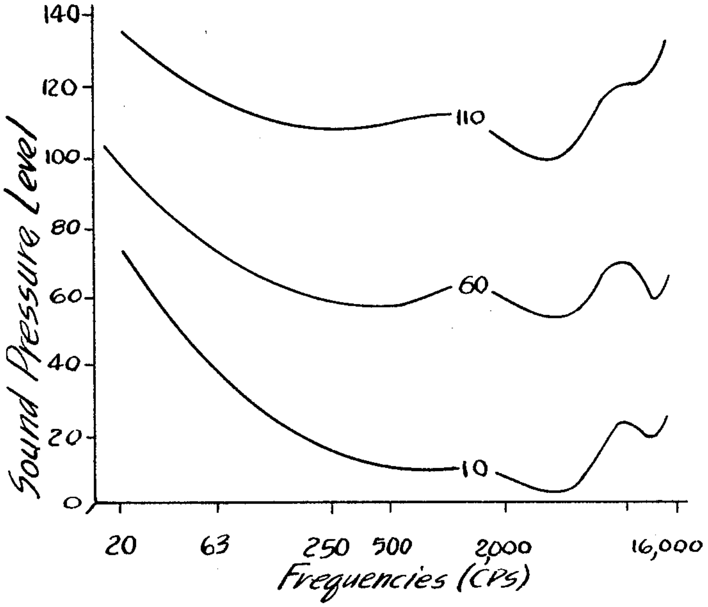
FIG. 1 is a graph of constant loudness levels produced by pure tones having various sound pressures. Sound pressure level is plotted against frequency.

FIG. 1 is a simplified graph illustrating the varying power required to maintain a pure tone in a frontal sound field at a constant loudness level from about 20 c.p.s. through about 16,000 c.p.s. Constant level curves of 10, 60, and 110 "phons" are shown. The loudness level of a sound in "phons" is equal to the sound pressure level (amplitude) in db of an equally loud standard sound. The curves of FIG. 1 show how the frequency response of the ear varies with loudness level.

Figure 3:
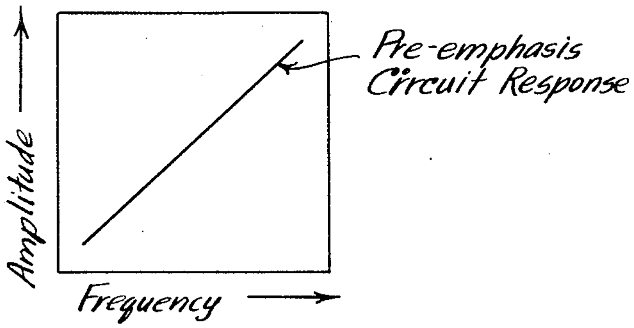
FIG. 3 shows one frequency response curve for a pre-emphasis circuit.
Figure 2:
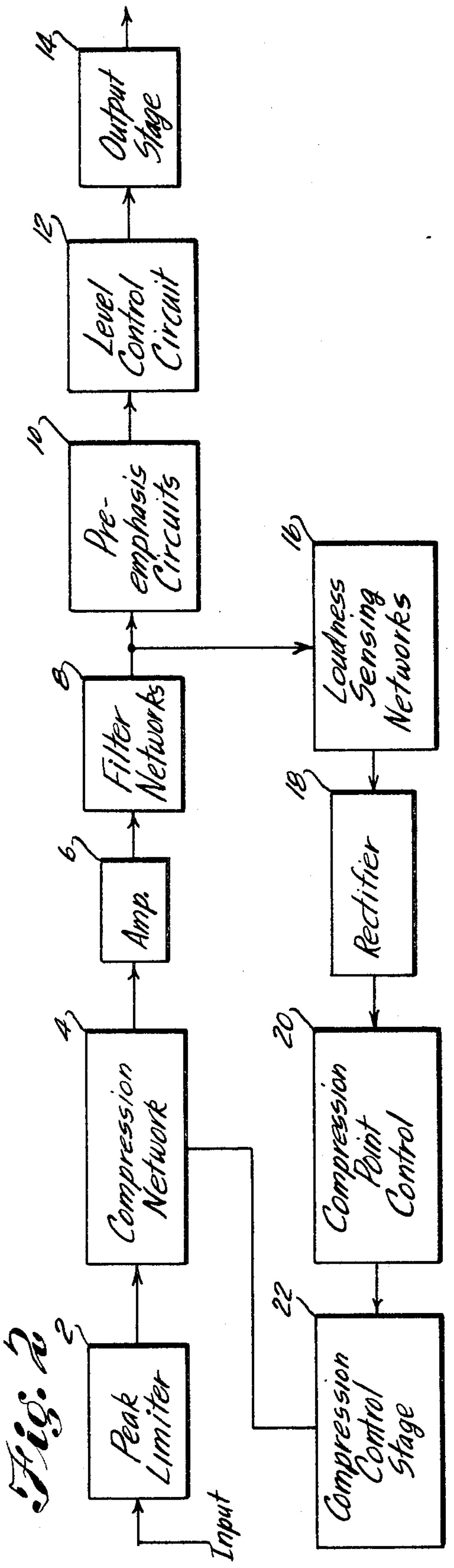
FIG. 2 shows an audio system with a constant loudness output.

FIG. 2 shows one embodiment of the invention, an audio system with a modified output, in this case a constant loudness output. In FIG. 2 an input signal is applied to a peak limiter 2, which is a known circuit designed to protect the system against signals of excessive amplitude. The output of peak limiter 2 is connected to the input of a compression network 4. Compression network 4 may or may not attenuate the input signal depending on the nature of a control signal received from a compression control circuit 20. The output from compression network 4 is amplified in an amplifier 6, then filtered in filter networks 8. The filtered signal from 8 is processed in pre-emphasis circuits 10 and forwarded through level control circuit 12 to an output stage 14. Pre-emphasis circuits 10 may comprise one or more adjustable frequency sensitive circuits which boost selected frequencies. FIG. 3 shows a response curve for a pre-emphasis circuit which would be useful in a voice communications applications. The preemphasis circuit or circuits could have other linear or nonlinear response characteristics to suit other applications.

The filtered output of filter networks 8 is connected to the input of loudness sensing networks 16. The output of 16 is rectified at 18 and connected to a compression control stage 20. Compression control stage 20 completes a feedback loop by generating a control signal which is forwarded to compression network 4 to control the attenuation of the input signal to the system. A compression point control 22 provides means for adjusting compression control stage 20.

Figure 4:
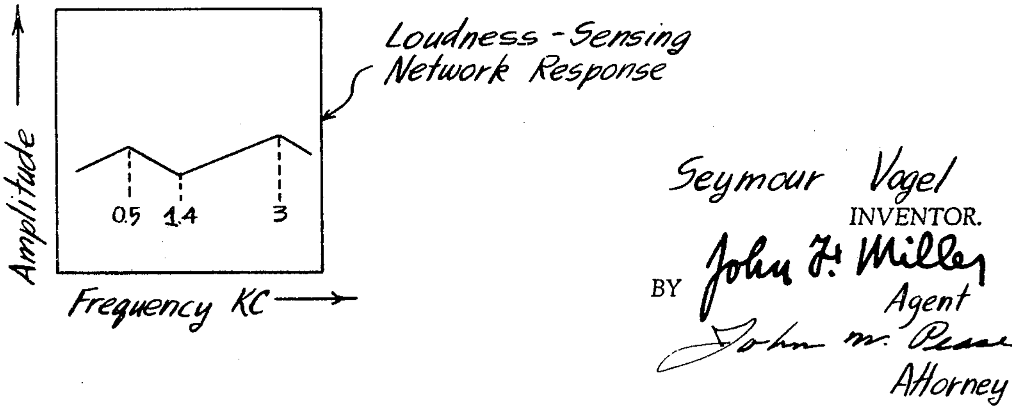
FIG. 4 shows one frequency response curve for a loudness sensing network.

One application of the circuit might be in a voice communications system. In this case box 8 of FIG. 2 may contain a single bandpass filter circuit passing frequencies ranging from 0.3 to 3 kc. A single loudness sensing circiut in box 16 and a single pre-emphasis circuit in box 10 may be used. The pre-emphasis circuit can be adjusted to accentuate the high-frequency sounds. Accentuation of consonant sounds is desirable in a voice communications system because they are essential to intelligibility. The loudness sensing circuit 16 can be designed or adjusted to have a linear or non-linear response to amplitude and/or frequency so that the signal feedback to compression network 4 will result in the attenuation of selected signal components. In this example the attenuation could be such that the system would have a constant loudness output. FIG. 4 shows a frequency response curve for loudness sensing network 16 which would give a constant loudness output if the system input were, for example, the 60 phon curve of FIG. 1.

Figure 5:
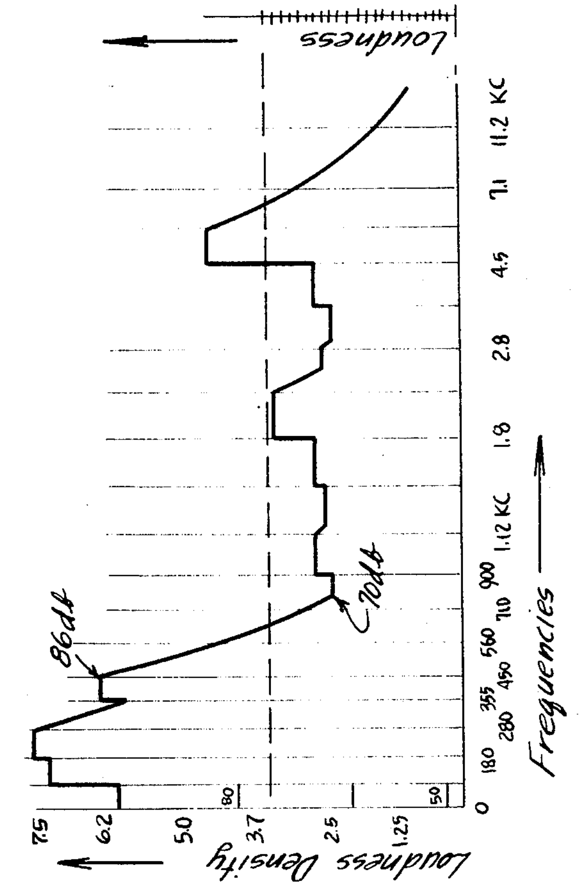
FIG. 5 shows a Zwicker diagram with a curve representing analysis of a sound.

FIG. 5 shows a simplified Zwicker diagram (named after Professor Eberhard Zwicker) representing studies of a multifrequency sound. The ordinate indicates loudness density and a horizontal line drawn across the diagram depicts a given loudness level. The heavy line is a plot of sound pressure (amplitude) produced by frequency components of a measured sound. The horizontal bars in each (frequency band) column correspond to sound-pressure levels, i.e., amplitude (in db). The frequency bands shown represent "critical bandwidths" wherein any frequency or combination of frequencies of a specific amplitude will produce a specific loudness density. Note that a frequency or frequencies of one amplitude within one critical bandwidth may produce one loudness density while a frequency or frequencies within another critical bandwidth and having the same amplitude, may produce a different density. It has been determined experimentally that a range of frequencies of given amplitude distributed over two adjacent critical bandwidths may produce a loudness density greater than the average of the two.

The proximity of the frequency bands affects loudness. Assume that the sound pressure level in the 355 to 450 c.p.s. band of FIG. 5 is 86 db, in the 710 to 900 c.p.s. band is 70 db, and is zero (or at the reference level) in the 450 to 560 c.p.s. and the 560 to 710 c.p.s. bands. Because of the "subjective" hearing characteristic of the human ear mentioned previously, the sound pressure in the 355 to 450 c.p.s. band produces a hearing effect over the 450 to 710 c.p.s. range. The loudness levels of the heard frequencies within the 450 to 710 c.p.s. range are indicated by the curve drawn between the 86 db level of the 355 to 450 c.p.s. band and the 70 db level of the 710 to 900 c.p.s. band. This curve denoting a hearing effect is drawn in conformance with procedures developed from listening tests and which are beyond the scope of this discussion. The 355 to 450 c.p.s. frequencies do not affect hearing at frequencies above (approximately) 760 c.p.s. because these frequencies produce a loudness level greater than that developed by the 355 to 450 c.p.s. frequencies. This is one form of the masking effect previously mentioned.

Figure 6:
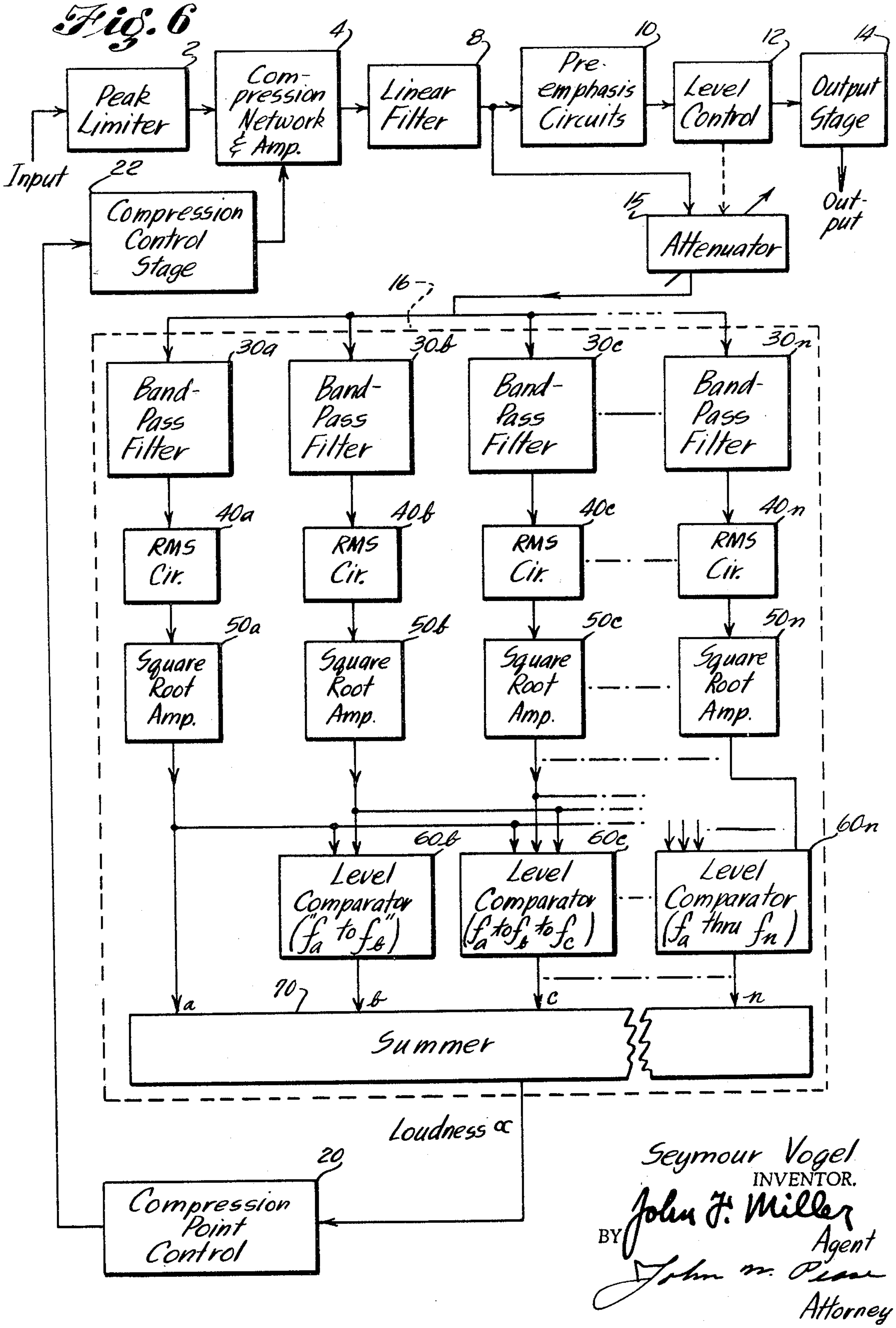
FIG. 6 shows an audio system which can have a constant loudness output.

The audio system of FIG. 6 is designed to compensate for the effects discussed in the explanation of FIG. 5.

FIG. 6 shows a circuit similar to that of FIG. 2 and with a detailed showing of one possible embodiment of a loudness sensing network. The circuit of FIG. 6 has the same elements with the same functions as that of FIG. 2 except that amplifier 6 of FIG. 2 is omitted, the amplifying function being incorporated in the compression network 4 of FIG. 6. Rectifier 18 of FIG. 2 is also omitted in FIG. 6. In FIG. 6 an attenuator 15 is inserted in the line between filter 8 and loudness sensing networks 16. This is mechanically linked to and controlled by level control 12. In some applications attenuator 15 is useful to reduce the signal sensed by loudness sensing networks 16.

Loudness sensing networks 16 comprises a plurality of bandpass filters **30*a*, 30*b*, 30*c*, . . . 30*n*, each of which receives the signal from filter 8 through attenuator 15. Each bandpass filter 30 may be designed or adjusted to pass selected frequencies only. The output signal from each bandpass filter 30 goes to a respective root mean square (RMS) circuit 40*a*, 40*b*, 40*c*, . . . 40*n*. Each RMS circuit 40 produces a D.C. voltage output signal proportional to the RMS of its input signal. These output signals go to respective square root amplifiers 50*a*, 50*b*, 50*c*, . . . 50*n*. Each of the square root amplifiers 50 has an output proportional to the square root of its input. The output signals of square root amplifiers 50*a* and 50*b* are fed to a level comparator 60*b*. The output signals from square root amplifiers 50*a*, 50*b*, and 50*c* are fed to a level comparator 60*c*. The output signals of all the square root amplifiers are fed to a level comparator 60*n*. Each level comparator 60 produces an output signal proportional to the largest of its input signals. The output voltages from level comparators 60 are summed in a summer 70 which forwards a sum voltage to a compression point control 20 which may be an attenuating circuit. The output signal from compression point control 20 goes to compression control stage 22 which forwards a control signal to control compression network 4**.

Each bandpass filter has a bandpass approximating a critical bandwidth. For example, filter **30*a* may have a bandpass of 280 to 355 c.p.s. and filter 30*n*** may have a 2.24 kc. to 2.8 kc. bandpass.

The acoustic energy of speech and music consists of complex waves. The outputs of the RMS circuits are proportional to the root mean square of the complex waveforms passed by the respective bandpass filters. A resistive element and a thermocouple could comprise the basic component of the RMS circuit. The heat produced by the resistive element is proportional to the RMS magnitude of the complex waveform. The thermocouple can produce a D.C. voltage that is proportional to the heat produced by the resistive element. The square root circuits are well known.

The function of the level comparators is to compensate for the frequency band proximity effect on loudness mentioned in the discussion of FIG. 5. Assume that (referring to FIGS. 5 and 6) bandpass filter **30*a* is set to pass the 280 to 355 c.p.s. frequency band, 30*b* is set to pass the 355 to 450 c.p.s. frequency band, filter 30*c* passes the 450 to 560 c.p.s. frequencies, and that filters 30*d*, 30*e*, 30*f* (not shown), . . . 30*n* filters pass ascending frequency bands in a like manner. Assume that there is no sound pressure (energy) in the frequencies passed by 30*a*, 30*c*, and 30*d*, that 86 db sound pressure is present in the frequencies passed by 30*b* (355 to 450 c.p.s.), and that 70 db is passed by filter 30*e*. (The number of bandpass filters and associated components in the loudness sensing network 16 is determined by the desired frequency range of the audio system.) The filter 30*a*, RMS circuit 40*a*, and square root amplifier 50*a* have no output voltages, 30*b*, 40*b*, and 50*b* have output voltages, and level comparator 60*b* which is connected to receive the output voltages from square root amplifiers 50*a* and 50*b* has an output voltage approximately equal to the output of 50*b*. Since 30*c*, 40*c*, and 50*c* have no output voltages, the only (and largest) voltage applied to the input of level comparator 60*c* (which receives the output voltages of 50*a*, 50*b*, and 50*c*) will be approximately equal to the output of 50***b* less an attenuation factor built into level comparator 60*c* to compensate for the effect of frequency band proximity on loudness. In this case $V_{60c}$ is equal to approximately $.8V_{50b}$. The remaining level comparators function is a similar manner with attenuators in each level comparator designed or adjusted to produce the necessary decrease in voltage corresponding to a given band of frequencies to approximate the effect of frequency band proximity on loudness.

The function of the summer (summing network) 70 is to produce an output voltage that is proportional to the summation of the voltages applied to its inputs. Since each of the input voltages corresponds to the loudness density of a band of frequencies, the summer output voltage is proportional to the loudness of the frequency range of the audio system. The summer output voltage is applied to the compression point control and the ensuing feedback action causes the audio system to maintain a constant level of loudness.

While the preferred embodiment of applicant's invention has been disclosed as a "constant loudness" audio system by way of example, the inventive principles are applicable to any desired output modification. For example, many systems require modified outputs other than the constant loudness output disclosed. Applicant's invention can be adjusted to emphasize selected frequencies and/or suppress others to attain any desired system characteristics. Any special effects such as might be desired in a system transmitting music or other nonvocal sounds can be easily attained using applicant's invention.

What is claimed is:

1. In an audio system, the improvement comprising: an input circuit for receiving an input signal, an output circuit for producing an output signal, signal modifying means for modifying said input signal connected between said input circuit and said output circuit, said modifying means comprising a loudness sensing circuit and a feedback circuit, said modifying means being adjustable to enable selective modification of said input signal, said loudness sensing circuit comprising a plurality of bandpass circuits for passing a respective plurality of selected frequencies from said input signal, and means for modifying said frequencies to generate an output signal from said loudness sensing network, said output signal from said loudness sensing network being applied to said feedback circuit, said means for modifying said frequencies comprising a plurality of root mean square circuits connected to receive the respective outputs of said plurality of bandpass circuits, a plurality of square root amplifiers connected to receive the respective outputs of said plurality of root mean square circuits, a plurality of level comparators connected to receive the outputs of selected ones of said plurality of square root amplifiers, and a summer circuit for summing the outputs of said plurality of level comparators.

2. The apparatus of claim 1 wherein said feedback circuit comprises a compression network, a compression control stage, and a compression point control circuit, said compression control stage being adapted to control said compression network in accordance with the output signal of said loudness sensing network as modified by said compression point control circuit.

3. The apparatus of claim 2 wherein said signal modifying means further comprises a pre-emphasis circuit for emphasizing selected frequency components of said input signal.

References Cited

FOREIGN PATENTS 951,058 3/1964 Great Britain.

ROY LAKE, Primary Examiner

J. B. MULLINS, Assistant Examiner

U.S. Cl. X.R.

330—132, 134